April 22, 1924.
W. L. HENDRICKS
1,491,264
DRIVING MECHANISM FOR MOTOR VEHICLES
Filed Sept. 10, 1919   3 Sheets-Sheet 3
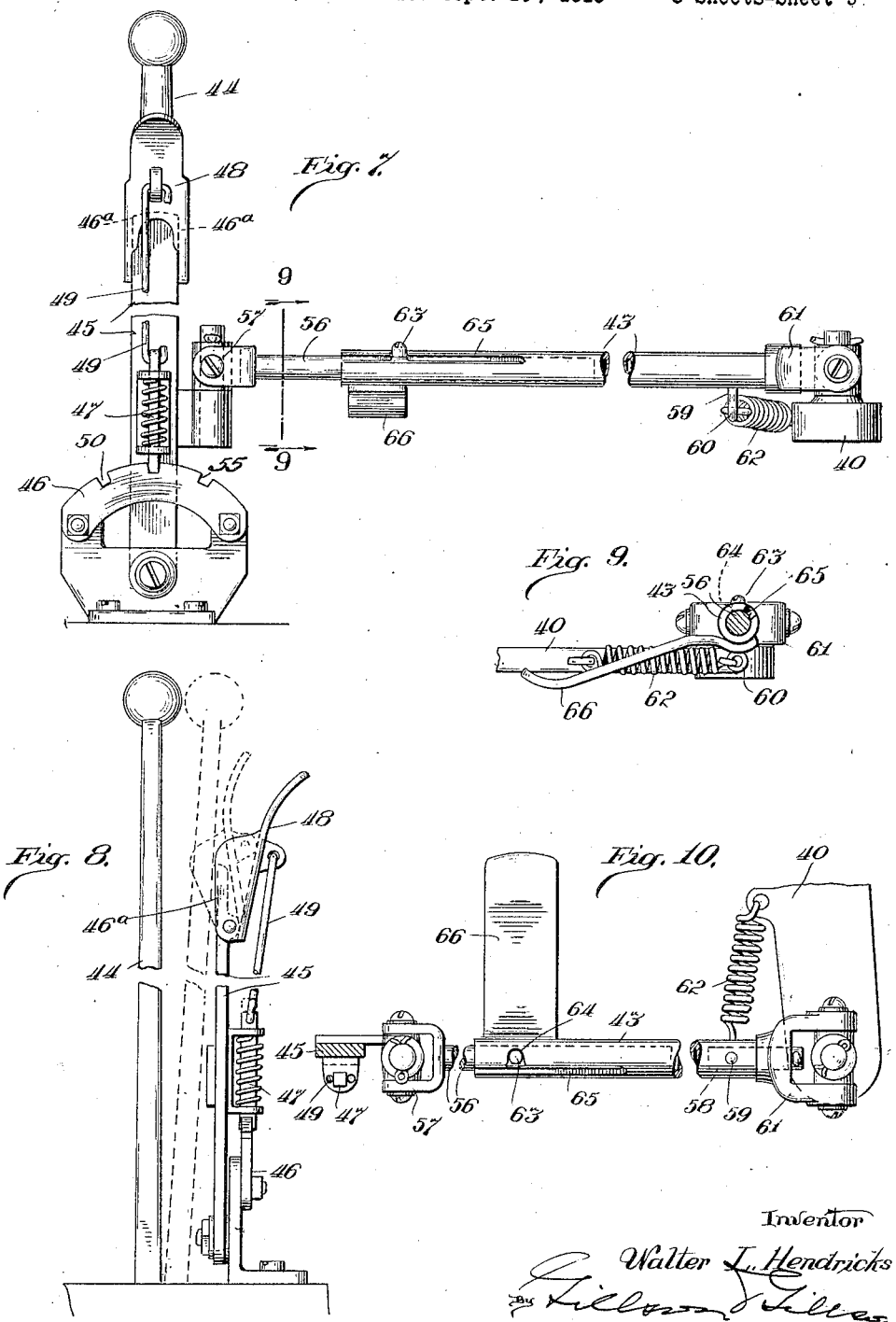
Inventor
Walter L. Hendricks
Attorneys.

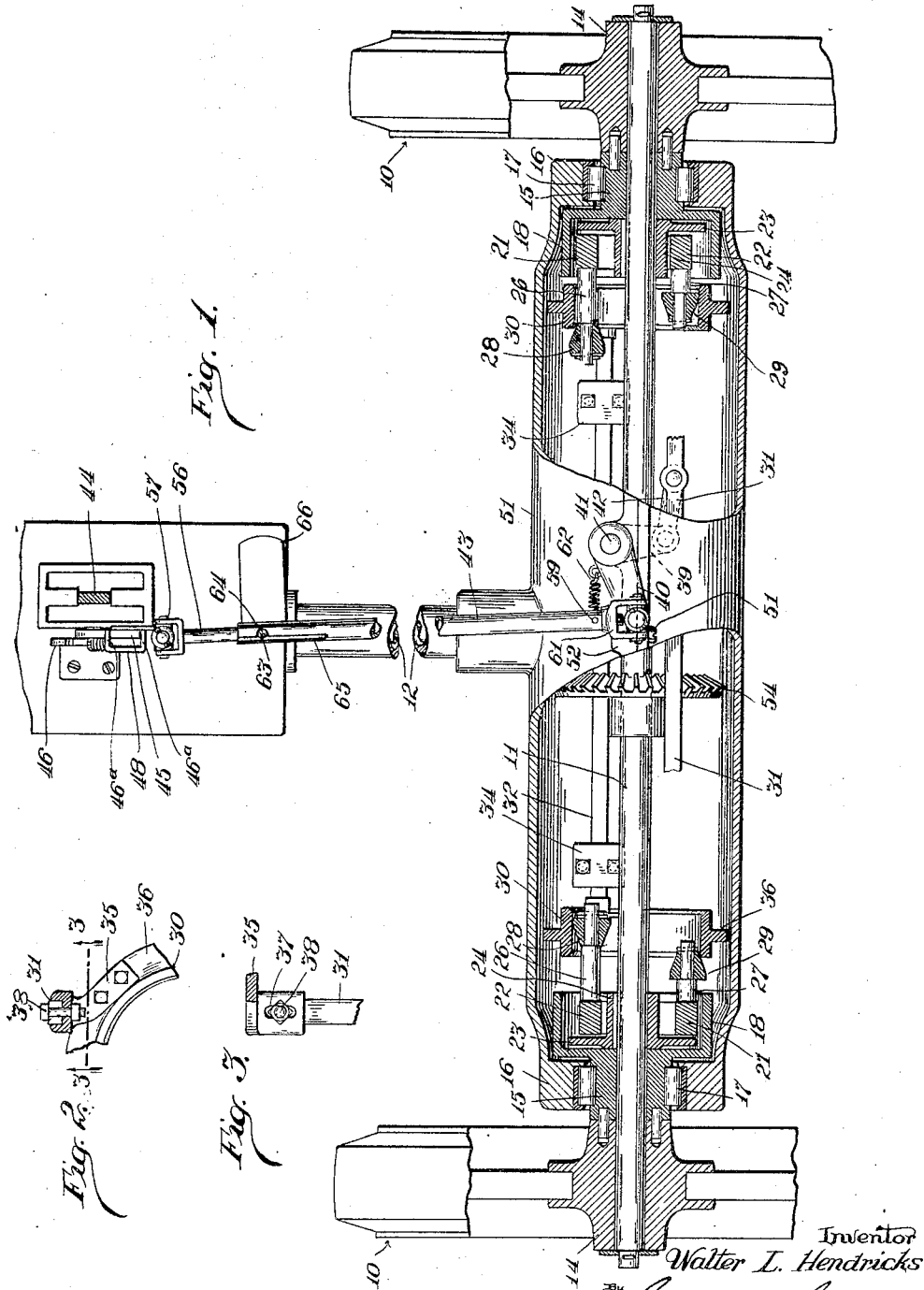

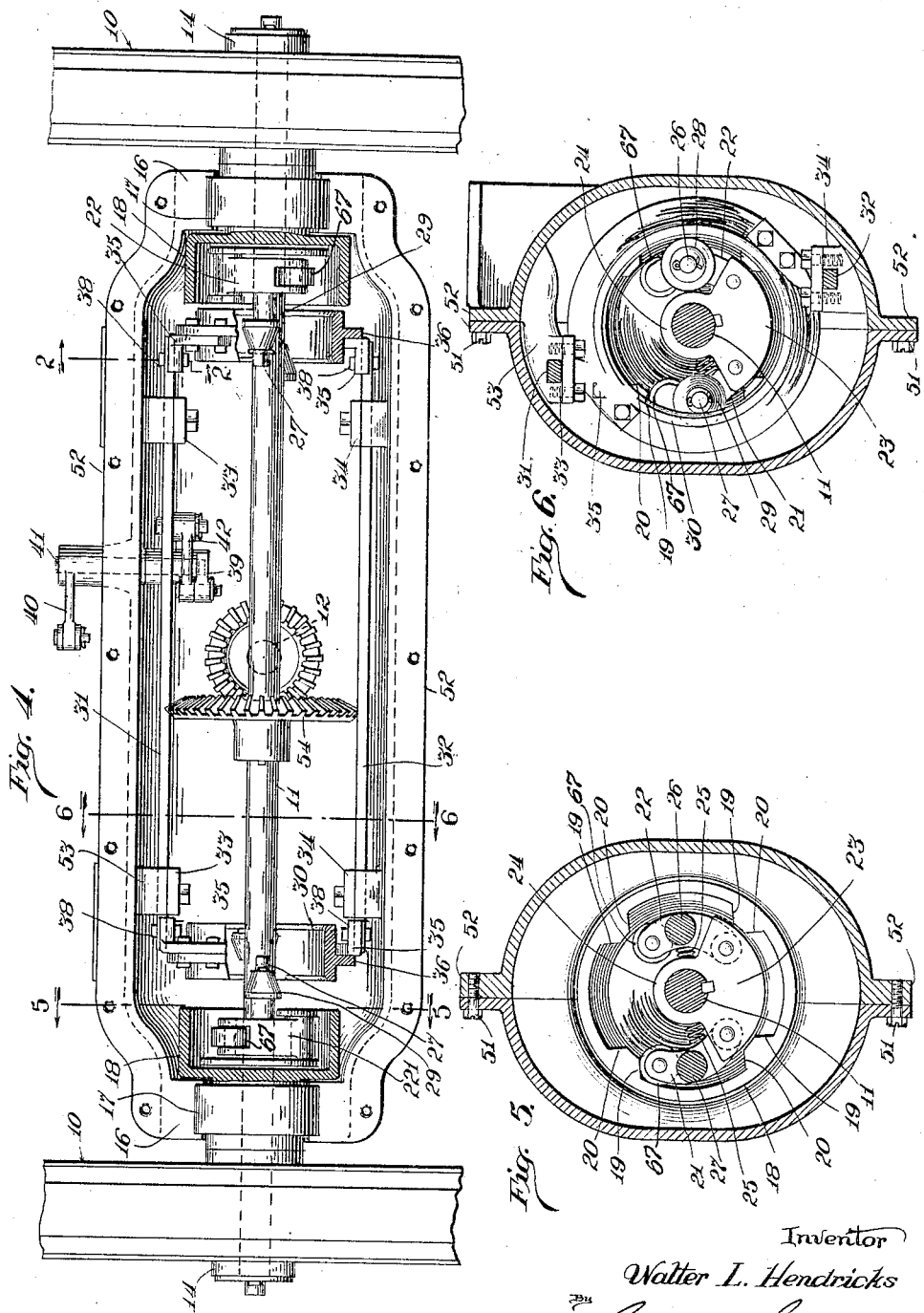

Patented Apr. 22, 1924.

1,491,264

UNITED STATES PATENT OFFICE.

WALTER L. HENDRICKS, OF AURORA, ILLINOIS.

DRIVING MECHANISM FOR MOTOR VEHICLES.

Application filed September 10, 1919. Serial No. 322,927.

*To all whom it may concern:*

Be it known that I, WALTER L. HENDRICKS, a citizen of the United States, and resident of Aurora, county of Kane, and State of Illinois, have invented certain new and useful Improvements in Driving Mechanism for Motor Vehicles, of which the following is a specification, and which are illustrated in the accompanying drawings, forming a part thereof.

The invention relates to means for applying the power to the traction or ground wheels of motor vehicles and has for an object the provision of such means wherein a solid driving axle may be used for supporting the vehicle while still providing for differential movement between the wheels at the two sides of the vehicle in rounding curves and the like. A further object is the provision in a device of this nature of simple means for reversing the direction of movement of the vehicle. The present invention is a simplification of and an improvement upon that disclosed in my co-pending application Serial No. 267,144, filed December 17, 1918, for power transmitting mechanism for motor vehicles. A detail of the present invention also provides for the elimination of end thrust in the pawl shifting mechanism of the clutch employed for communicating motion from the axle to each of the traction wheels mounted thereon.

An illustrative embodiment of the invention is disclosed in the accompanying drawings, in which—

Fig. 1 is a plan view, partly in section;

Fig. 2 is a detail section on line 2—2 of Fig. 4;

Fig. 3 is a detail section on line 3—3 of Fig. 2;

Fig. 4 is a rear view, partly in section, of an axle and associated parts embodying the invention, with the adjacent section of the axle housing removed;

Figs. 5 and 6 are sectional views taken on lines 5—5 and 6—6, respectively, of Fig. 4, but showing the complete axle housing;

Fig. 7 is a side elevation of the pawl and gear shifting levers;

Fig. 8 is an end elevation of the structure of Fig. 7;

Fig. 9 is a vertical section on line 9—9 of Fig. 7; and

Fig. 10 is a plan view of the pawl-shifting connecting rod showing the pawl-shifting lever in section.

The ground or traction wheels of the vehicle are shown at 10, the rear axle at 11, and the propeller shaft at 12. The propeller shaft is driven by selective transmission gearing (not shown), in the usual manner, and controlled by a gear shift lever 44 moving an an H-shaped path, as is well known.

The ground wheels are loosely mounted upon the opposite ends of the axle 11, and the hubs 14 of these wheels each have an inward extension 15, which is journaled within an axle housing 16, being preferably provided with roller or other anti-friction bearings, as 17. The body of the vehicle is carried on the housing 16, if desired, by means of the usual spring suspension.

For application of power to the ground wheels the hub extensions 15 are expanded at the inner end into a drum, as 18, having two sets of oppositely facing ratchet shoulders, as 19, 20 (Fig. 5). For coaction with these shoulders a pair of oppositely acting pawls, as 21, 22, are pivoted to a sector of a disc, as 23, which is carried by a hub, as 24, which hub is shown as keyed to axle 11. Each pawl is shown as outwardly spring-pressed, as by a spring 25, and as provided with a roller, as 67, at its end.

The pawls 21, 22, would lock the ground wheel to the shaft and prevent an overrunning or "differential" action of the wheels if both were allowed to coact with the ratchet shoulders at the same time. To prevent such action means are provided to selectively hold one or the other depressed against the action of springs 25. For this purpose each pawl carries a pin, as 26 or 27, which pins, as shown, project from the pawls in a direction parallel with the axle. Each pin is shown as reduced in size at its end to serve as a bearing for a tapered roller cam 28 or 29.

The cams 28 and 29 are actuated to depress the pawls through the medium of rings 30, which rings are mounted for reciprocation in a direction parallel with the axle by being supported on rods 31, 32, which rods are slidably supported in blocks 33, 34, secured to the axle housing. A bracket, as 35, as most clearly shown in Fig. 2, is preferably secured to the rib 36 on the exterior of each ring, for the attachment of the ring to each rod. In order that the rings may be longitudinally adjustable on the rods 31 and 32, the bolt-hole in the bracket 35 is preferably elongated, as shown at 37 (Fig. 3), in order that the bracket may be adjusted on bolt 38 utilized to secure the bracket to the rods 31, 32.

As a means for causing reciprocation of rods 31 and 32, and rings 30, a pair of cranks, as 39, 40, are shown mounted on crank shaft 41, which is journaled in the axle housing. Crank 39 is shown as connected with rod 31 by means of link 42, and motion may be imparted to crank shaft 41 by means of a tubular link 43, shown as extending to a point adjacent the gear set.

The usual gear shift lever is indicated at 44, working in an H-shaped path, as is well known. For operation of the pawl shift with the same hand and at the same motion with the gear shift, a pawl shift lever, as 45, provided with a sector and spring bolt latch, as 46, 47, is shown. The latch lever 48, which, through link 49, controls the spring latch 47, is shown as pivoted adjacent the top of lever 45 and as projecting thereabove. The top of the lever 45 is preferably arranged to move in a path closely adjacent the path of the gear shift lever when the latter is swung toward the pawl shift lever. The latch lever 48 is shown as formed with a pair of flanges, as 46$^a$, adapted to pass on each side of gear shift lever 44 when the latch lever is pressed against it.

There are three positions of the pawl mechanism provided for. The forward drive, in which the parts are shown in Figs. 1 to 6 inclusive; the neutral, in which the lever is shown in Figs. 7 and 8, and in which the rings 30 will span both rollers 28 and 29, thus holding both sets of pawls in the inoperative position and leaving the wheels 10 free; and the rear drive position, in which the pawl shift lever will be in its forward position and the pawls 22 will be in for reverse drive. With the levers in the position of Figs. 7 and 8, both may be grasped and squeezed together with one hand when the latch 47 will be drawn, and the lever 44 may be rocked either to right or left and then shifted forward or backward carrying lever 45 with it. If rocked to the left the motion will not be sufficient to allow latch 47 to catch. If the levers be moved forward and released, the gears will be in reverse and the latch 47 will fall into the forward notch 50 of the sector. If moved to the rear the gears will be in the first speed or "low" and the latch will fall into notch 55 of the sector, and the pawls will be in the position indicated in Figs. 1 to 6.

Under these circumstances the gear shift lever 44 may be grasped alone and moved to second or "high" speed, leaving the lever 45 untouched. If moved to "high" and it is desired to return both levers to neutral, they may both be grasped simultaneously and moved to that position and released. Or the latch lever 48 may be grasped alone and swung so as to manipulate the latch, and the pawl shift lever may be shifted independently.

It is often desirable to allow the wheels to drive the engine for braking purposes, or to keep the engine alive. In forward drive this would necessitate placing the pawls in reversing position, yet the need may be only momentary. Provision is therefore made for shifting the pawls without moving the lever 45. To this end there is shown a rod, as 56, connected with the pawl shift lever 45, as at 57, and sliding within a tube, as 43, which comprises the connecting link for the pawl shift. The tube 43 is adapted to rotate on a longitudinal axis with a rod, as 58, secured in its end, as by a pin 59, which may have an eye, as 60, integral with one end thereof. The rod 58 is shown as passing through and journaled in a yoke 61 by means of which the link is attached to crank 40. If a spring, as 62, is attached to eye 60 and to the crank 40, the tube 43 will be resiliently held at its limit of rotation in one direction.

For connection between the rod 56 and the tube 43 a screw, as 63, is shown secured to the rod and seated in a recess 64, forming a lateral enlargement of a slot, as 65. A foot lever, as 66, is shown secured to the tube 43.

With the parts in the position of Figs. 1 to 6, if the foot lever be depressed against the action of spring 62 and then be pressed forward, the rod 56 and tube 43 will telescope and the pawls will be shifted and may be returned by a reverse action without moving the lever 45.

The forward acting pawl 21 at the left of Figs. 1 and 4 is shown as having a short pin 27, and an inwardly tapering cam roller 29, while the forwardly acting pawl 21 at the right in these figures has a long pin 26 and an outwardly tapering cam roller 28. The reverse arrangement is provided with the reverse pawls 22. Therefore motion of both rings 30 to the right will depress both reverse acting pawls, and to the left will depress both forward acting pawls. To prevent constant lateral pressure on the pawls, as well as on the rings 30, tending to move these rings, the cam rollers have a short cylindrical portion at their greatest circumference which bears on the interior of ring 30 when the ring is at the limit of its travel in either direction.

The axle housing is shown as divided into two vertical longitudinal portions, being bolted together by bolts, as at 51, in flanges 52. It is desired to make the parts especially accessible, for which purpose they are so arranged as to be readily removable. To this end the blocks 33 for support of the rod 31 are supported in extensions 53 from the stationary or forward half of the axle housing. Since no interior parts are secured to the rear half of the housing the same may be freely removed. The roller bearings 17, as is usual, are self-contained, being provided with an exterior ring or race. With the rear plate of the housing removed, the rods 31 and 32 may be released from their blocks, link 42 may be removed, and the rear ground wheels, the axle, roller bearings 17, rings 30, rods 31, 32, and bevel gear 54 may be freely withdrawn from the housing in their assembled condition. While in operation the axle housing will be partially filled with lubricant.

It will be obvious that many changes may be made in the physical embodiment of the invention without departing from the spirit thereof.

I claim as my invention:

1. In combination, a vehicle axle, a ground wheel freely revoluble on said axle, sets of oppositely facing ratchet shoulders secured to said wheel, a pair of oppositely acting pawls secured to said axle for coaction with said ratchet shoulders, cam actuated means for rendering each of said pawls inoperative and an element having a limited movement in opposite directions longitudinally of said axle and independent of the movement of the wheel and the axle, adapted, when at the limit of its movement in each direction, to act on one of said means, said element being carried independently of said wheel member.

2. In combination, a vehicle axle, a ground wheel freely revoluble on said axle, sets of oppositely facing ratchet shoulders secured to said wheel, a pair of oppositely acting pawls secured to said axle for coaction with said ratchet shoulders, a pin projecting from each pawl parallel with the axle, a tapering cam surface carried by each pin, the cam surfaces on the two pins tapering oppositely and a reciprocable member adapted at opposite limits of its travel to coact with the cam surfaces alternately to selectively prevent coaction of one of the pawls with the ratchet shoulders.

3. In combination, a vehicle axle, a ground wheel freely revoluble on said axle, sets of oppositely facing ratchet shoulders secured to said wheel, a pair of oppositely acting pawls secured to said axle for coaction with said ratchet shoulders, a pin projecting from each pawl parallel with the axle, a tapering cam surface carried by each pin, the cam surfaces on the two pins tapering oppositely and a ring surrounding the path of revolution of said cam surfaces and mounted to be reciprocated in a direction parallel with the axle and adapted at opposite limits of its travel to coact with the cam surfaces alternately to selectively prevent coaction of one of the pawls with the corresponding set of ratchet shoulders.

4. In combination, an axle, a ground wheel having motion independent of the axle, a plurality of sets of oppositely directed ratchet shoulders secured to said ground wheel, a pair of oppositely acting pawls turning with said axle and spring pressed toward said ratchet shoulders, a pin projecting from each pawl, said pins of different lengths, an inwardly tapering cam roller on the shorter pin, an outwardly tapering cam roller on the longer pin, a ring mounted for reciprocation so as to act on the cam portions of said rollers in alternation to depress said pawls, the path of movement of the ring being such that at the limit of its travel the largest circumference of one of the cam rollers will bear on the interior of the ring whereby tendency to lateral motion of the ring or roller will be avoided.

5. In combination, an axle, ground wheels having motion independent of the axle, shiftable pawls movable to positions of forward or rear drive of said wheels or to a neutral position, a gear shift lever, and means adapted to be grasped independently or in common with said gear shift lever for shifting said pawls.

6. In combination, an axle, ground wheels having motion independent of said axle, pawls shiftable to drive said wheels forward or reverse, a pawl shift lever, means for locking said lever in forward or reverse drive position, and means for disconnecting said pawls and shift lever and shifting said pawls without disturbing said locking means.

7. In a motor vehicle, in combination, a gear shift lever, a driving member, a driven member revolubly mounted relatively to said driving member, shoulder means carried by one of said members, pawl means carried by the other of said members, and when in one position adapted to engage said shoulder means for driving said driven member forwardly, and when in another position adapted to engage said shoulder means for driving said driven member rearwardly, cam actuated means for releasing said pawl means from forwardly driving position or from rearwardly driving position, or from both positions simultaneously, an element mounted on said vehicle independently of said driven member and movable transversely of said vehicle for controlling the operation of said cam engaging means and means associated with said lever and adapted to be simultaneously operated therewith, for operating said element.

8. In a motor vehicle, in combination, a driving member, a driven member revolubly mounted relatively to said driving member, means carried by one of said members and adapted to interlock with the other of said members for driving the same forwardly, when in one position, and for driving it rearwardly, when in another position, cam actuated means for releasing said first-named means from forwardly driving position or from rearwardly driving position, or from both positions simultaneously, mechanism having a portion thereof extending longitudinally of said vehicle for operating said cam actuated means, and means secured to the forward end of said mechanism for operating the same.

WALTER L. HENDRICKS.